April 14, 1931. A. H. WOLFE 1,800,584
MEANS FOR TRANSFORMING RECIPROCATING MOTION INTO ROTARY MOTION
Filed July 26, 1924  2 Sheets-Sheet 1

Fig.4ª.

Inventor.
Albert H. Wolfe

April 14, 1931.  A. H. WOLFE  1,800,584

MEANS FOR TRANSFORMING RECIPROCATING MOTION INTO ROTARY MOTION

Filed July 26, 1924   2 Sheets-Sheet 2

Albert H. Wolfe
Inventor

Patented Apr. 14, 1931

1,800,584

UNITED STATES PATENT OFFICE

ALBERT H. WOLFE, OF SANTA ROSA, CALIFORNIA

MEANS FOR TRANSFORMING RECIPROCATING MOTION INTO ROTARY MOTION

Application filed July 26, 1924. Serial No. 728,475.

The main object of the invention is the provision of means for the purpose specified which shall be of simple construction, have the fewest possible parts, be efficient and practically noiseless in operation, durable and not liable to become inoperative, and capable of rotating a shaft in the same direction not only when the reciprocating means moves forwardly, but also when the same moves rearwardly.

A further object is the provision of means for the purpose specified wherein the use of springs is eliminated and which has no dead center or centers.

A further object is the provision of efficient means of the character mentioned which shall be adapted to operate a great variety of mechanisms or machines, such as washing machines, wringers, grindstones, pumps, post and pile drivers, invalid chairs, hand cars, etc., etc. A specific and very important use for which the means is adapted is the automatic regulation of windmills for pumping water, as hereinafter set forth, and other similar purposes wherein automatic control is desired.

A further object is the provision of means of the character specified which shall be adapted to be operated by a hand lever, a windmill, a steam engine, by ocean waves, and other mechanical powers.

The invention consists in certain novelties of construction and in the combinations of parts as herein set forth and claimed.

The accompanying drawings illustrate an example of the embodiment of the invention, the same being constructed and the parts combined according to the best mode of procedure I have so far devised for the practical application of the principle.

There is also shown a sprocket wheel on the rotary shaft at one side of the mechanism to receive a sprocket chain for driving machines of various types, and at the other side a drum and clutch mechanism and cords or wires or ropes adapted for use in operating a variety of machines and devices, and especially for the automatic control of a windmill for pumping water.

Figure 1:
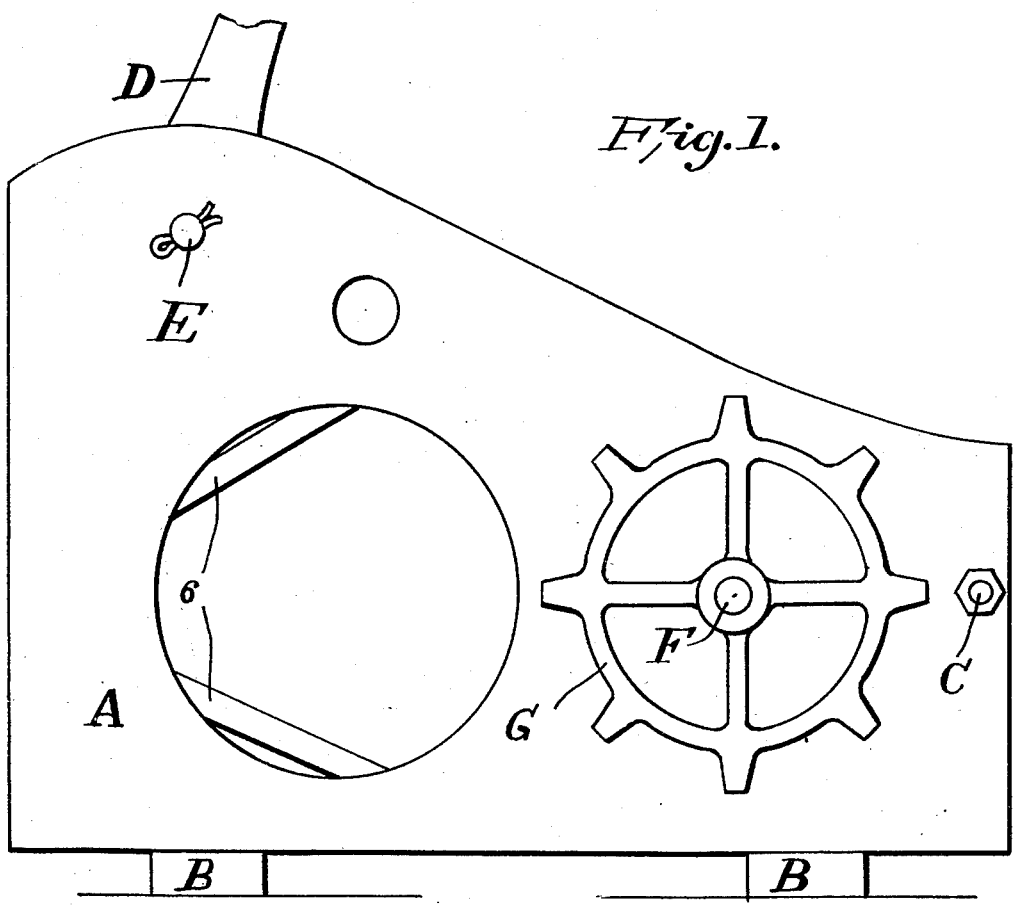
Figure 1 is a side view in elevation, showing the transforming means when operated by a hand lever and when energy is to be transmitted to another machine or device by a sprocket wheel or a drum.
Figures 4, 5:
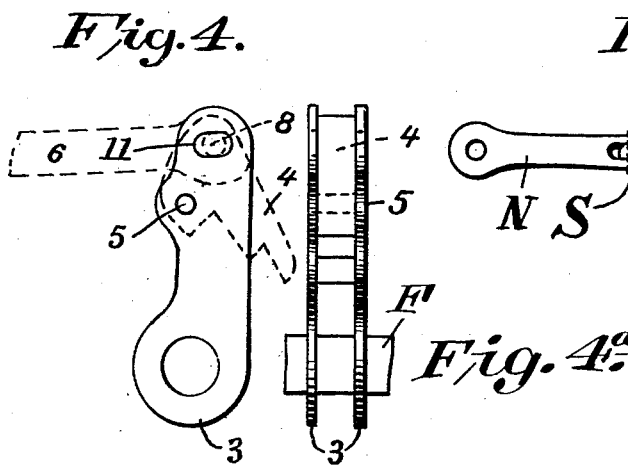
Figure 4 is a side view in elevation of one of the pawl-supporting means.

Figure 4ª is an edge view of Figure 4.

Figure 2:
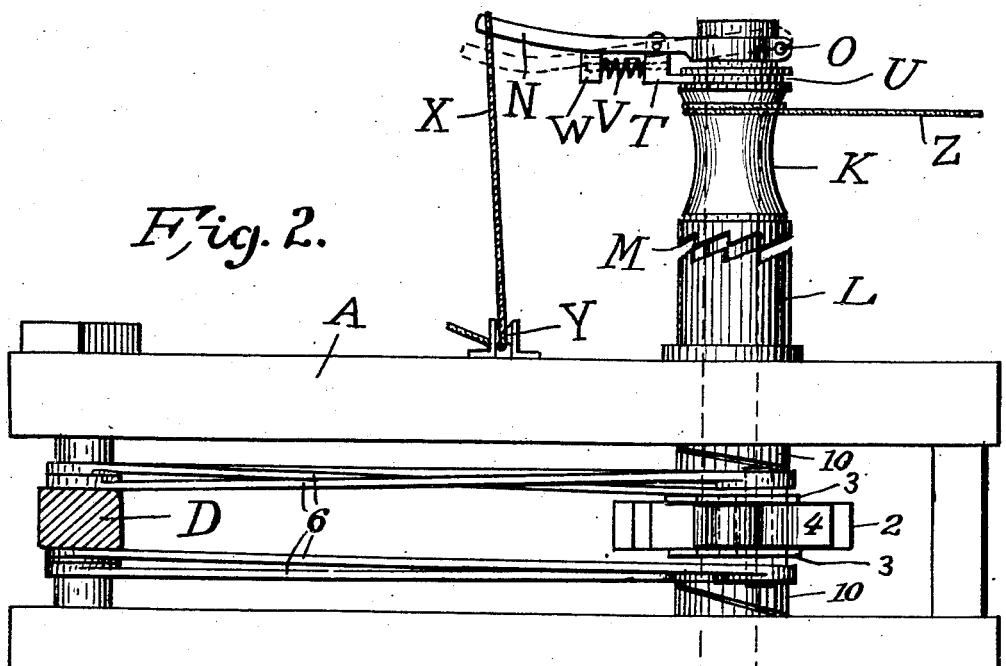
Figure 2 is a top plan view of Figure 1, the hand lever being in section.

Figure 5 is an end view of the clutch mechanism in Figure 2 for throwing the drum into and out of gear.

Referring to the figures, A A are two parallel members of any suitable material united by base piece B B and bolts C constituting a conventional frame for supporting the transforming means, the type of frame being varied as circumstances may warrant. D designates a hand lever mounted upon a fulcrum bolt E supported in the frame. F is a rotary shaft passed through the members A, A and in practice having suitable bearings. On the shaft at one side is a sprocket wheel G secured to the shaft by a cotter pin H passed through the hub and shaft. When the sprocket wheel is not to be used the cotter pin is removed and inserted in the hole I so the shaft will not transmit motion to the wheel.

On the shaft F at the other side is a drum K normally loose on the shaft, which can interlock with a sleeve or member L, fixed on the shaft, through the medium of interlocking teeth or offsets M, as clearly shown by Figure 2. Means for shifting the drum into and out of gear consists of the lever N forked at one end and pivoted by pivot pin O outside of and to a U-shaped yoke member P which is held in place by a nut or washer R, which nut or washer also limits the outward movement of the lever.

To the lever N is loosely pivoted by pin S a shifting lug T the end of which is seated within groove U at one end of the drum. On the lug T is a pin carrying a helical spring V which bears against a seat on a lug W carried by the lever arm. The spring normally holds the drum out of gear so it does not rotate with the shaft.

The gearing for transforming the reciprocating movements of the lever D into rotary movement of the shaft F comprises a ratchet wheel 2 keyed on the shaft, two pairs of parallel pawl-supporting members 3, 3 and 3, 3 loosely mounted on the shaft at adjacent ends, two pawls 4, 4 each pivoted between a pair of members 3, 3 by a pivot pin 5, and two pairs of parallel reciprocating bars 6, 6 and 6, 6, the same being pivoted at adjacent ends to the short arm of lever D by a bolt 7 and the opposite spaced apart ends pivoted to the ends of members 3, 3 and 3, 3 by pivot pins 8, 8, which pins also pass through the pawls, as shown. Each pawl when transmitting motion simultaneously engages two teeth, as 9, 9, of the ratchet wheel, and the pawls are disposed so that they extend in opposite directions relatively to the shaft, as shown by Figure 3.

Outside the adjacent ends of the pawl-carrying members 3, 3 and 3, 3 and on the shaft in frictional contact with the ends of the pawl-carrying members and the inner surfaces of the frame are two split spring washers 10, 10 which hold the surfaces of the adjacent ends of said pawl-carrying members in frictional contact. To shift the pawls from teeth-engaging to non-engaging positions without the use of springs, the outer ends of the pawl-carrying members are provided with slots 11, 11 through which the pivot pins 8, 8 loosely pass. As the pins 8, 8 closely fit the holes in the ends of bars 6, 6 and the pawl-carrying members are frictionally held by the washers 10, 10, the movements of members 6, 6 will shift pivot pins 8, 8 in the slots 11, 11 and rotate the pawls about pivot pins 5, 5 and alternately throw them into and out of mesh with the ratchet wheel teeth. By this construction and arrangement the gear works without springs and is practically noiseless in operation.

Figure 3:
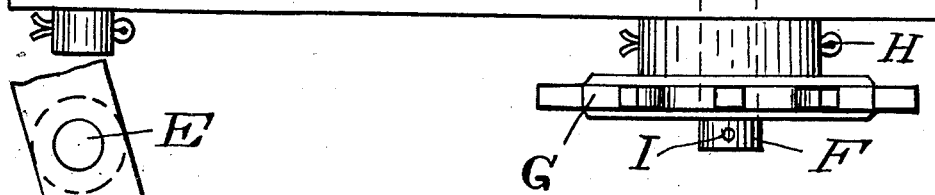
Figure 3 is a side view of the transforming means partly in section, the supporting frame being omitted.
Figure 3:
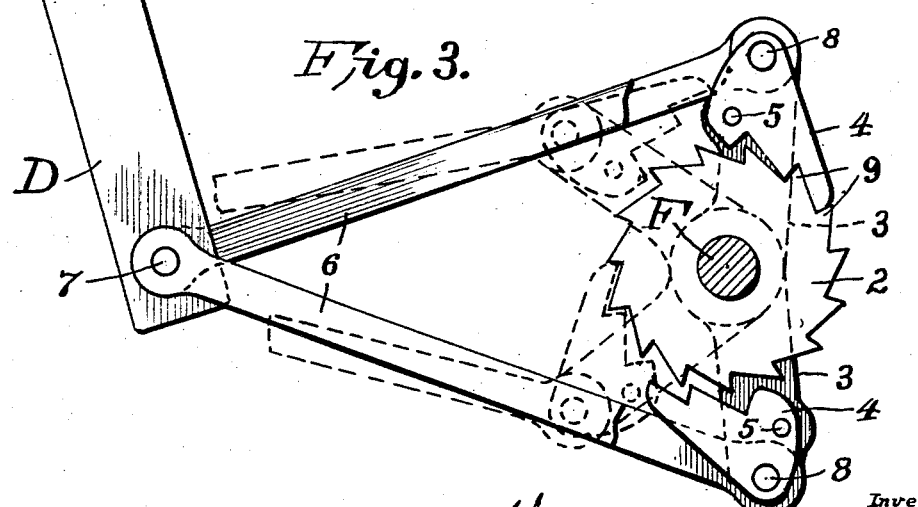

By reference to the full and dotted lines in Figure 3, it will be clear that when the short arm of lever D moves towards the right the upper pawl rotates the ratchet wheel and the lower pawl moves in the same direction but out of contact with the ratchet teeth, and that when the short arm of the lever moves towards the left the lower pawl is shifted into gear and the upper pawl is shifted out of gear. Obviously, there is no dead center or centers and the shaft and ratchet wheel are rotated in the same direction during both the forward and rearward travel of the short arm of the lever. Further, it will be seen that there is in the gear a double leverage—from the shaft F to pivot 8 and from pivot 7 to fulcrum bolt E, so a great amount of energy can be transmitted to shaft F.

The pivot pin 7 can connect the reciprocating bars 6, 6 with any source of power, such as a reciprocating steam engine or other motor.

As before mentioned, a specific and important use for which the mechanism is adapted is the automatic control of windmill operating pumps. The apparatus or mechanism is disposed so the well known reciprocating rod of the windmill reciprocates the lever D at the same time it operates the pump. To lever N is attached a wire or other cord or rope X which passes over a pulley Y the free end of the wire or cord being attached to a float valve in the water tank. A wire rope or cord or the like Z on the drum extends to the well known gear-shifting means of the windmill. When the tank becomes full the float pulls the wire X, shifts lever N so the drum K is rotated, which winds up wire or cord Z and throws the windmill controlling gear out of operation. The lowering of the water in the tank by releasing the lever N and the drum allows the cord or rope Z to unwind, which action throws the windmill gear again into operation.

In adapting the mechanism for a post driver the wire cord or rope Z passes over a pulley and has a weight at the end. The lever N is operated by hand. When the weight is raised by the rope being wound up on the drum the lever is shifted, throwing the drum out of gear and allowing the rope to unwind and the weight to fall.

From the foregoing description taken with the drawings it will be clear that I have provided novel and superior means for transforming reciprocating motion into rotary motion, which attains the ends set forth as the objects of the invention. Its characteristics of simplicity, efficiency, durability, noiselessness in operation, and adaptation for a multiplicity of uses will be appreciated by those skilled in the art.

What I claim is:

1. Means for transforming reciprocating motion into rotary motion comprising a rotary shaft suitably supported, a ratchet wheel having pawl-engaging teeth at its periphery, said wheel being fixed on the shaft, pairs of pawl-supporting members, each pair at adjacent inner ends pivotally supported to turn through the arc of a circle and the opposite adjacent outer ends of each pair being slotted, a pawl pivoted between each pair of supporting members, pairs of reciprocating bars, and pivotal means, as pins 8, 8, within the slots at the outer ends of the supporting members, each pin connecting the adjacent ends of a pair of reciprocating bars to a pawl.

2. The subject-matter of claim 1 wherein spring washers 10, 10 are located on the shaft to frictionally prevent the initial movement of the pairs of pawl-supporting members so the reciprocating bars will rock the pawls.

3. The subject-matter of claim 1 wherein the pairs of pawl-supporting members are located on and extend in opposite directions from the rotary shaft, and the pawls are outside the ratchet wheel and extend in opposite directions relative to the shaft, whereby said pawls alternately are caused to engage and become disengaged from the ratchet wheel.

4. The combination in means for transforming reciprocating motion into rotary motion, of a rotary shaft, a ratchet wheel fixed on the shaft, pairs of pivoted pawl-supporting members on the shaft having slots, as 11, at adjacent outer ends, pawls located outside the ratchet wheel and extending in opposite directions relative to the shaft pivoted to the pairs of supporting members, reciprocating bars for moving the pawl-supporting members and pawls, and pins, as 8, 8, connecting the reciprocating bars to the pawls, said pins passing through and movable within the slots, as 11, 11, in the supporting members.

5. The combination in means for transforming reciprocating motion into rotary motion, of a rotary shaft, a ratchet wheel fixed on the shaft, a pair of pivoted pawl-supporting members suitably supported to move through the arc of a circle, each of said members at its outer end being slotted, a pawl pivoted between the outer ends of said members, a pair of reciprocating bars for moving the pawl-supporting members and the pawl, and a pin, said bars being connected to the pawl by said pin passed through and movable within the slots at the ends of the supporting members.

In testimony whereof I affix my signature.

ALBERT H. WOLFE.